Dec. 15, 1959      D. F. TRYON      2,917,287
HEATING AND/OR COOLING SYSTEM
Filed Oct. 28, 1957
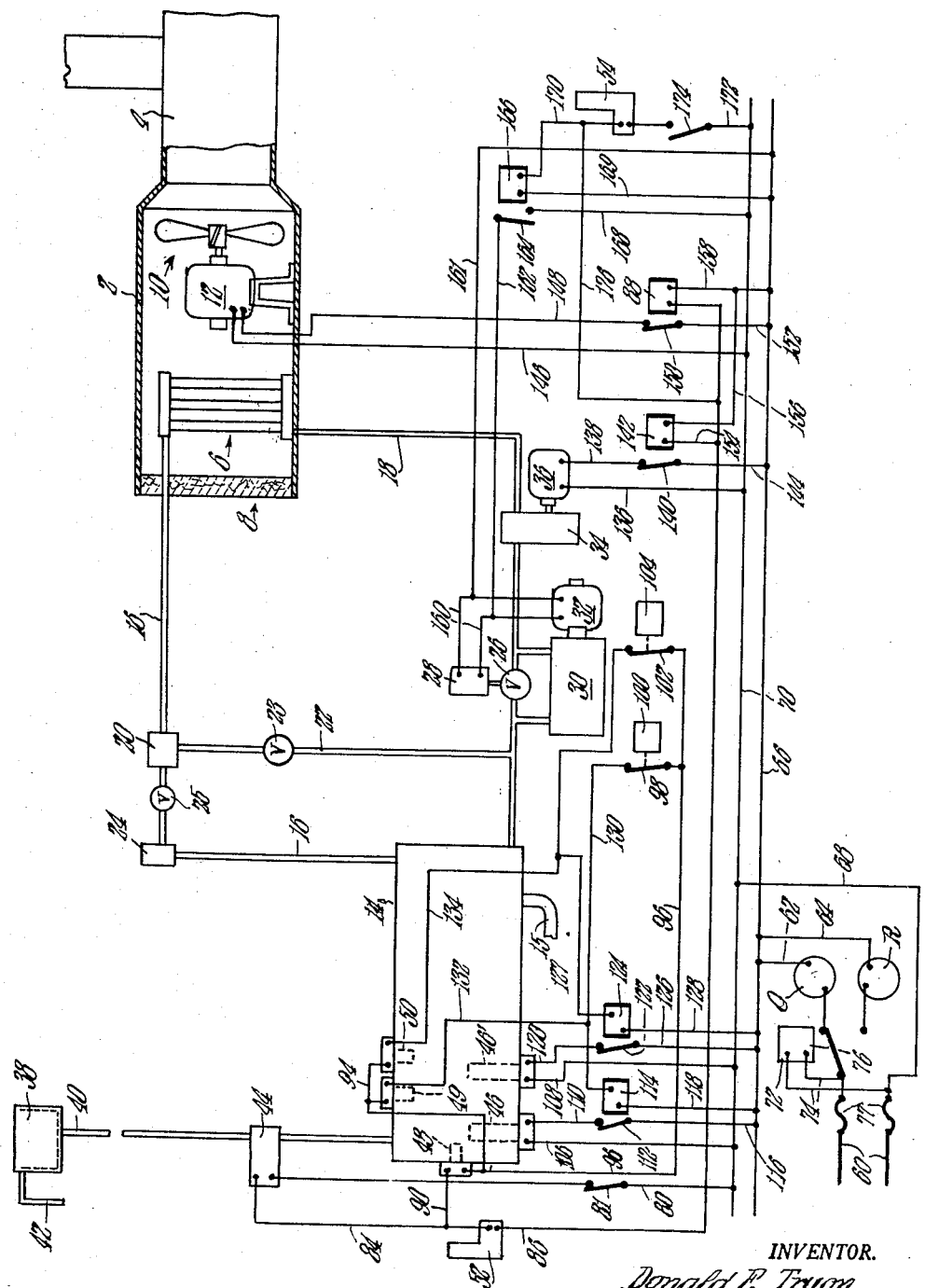
INVENTOR.
Donald F. Tryon.
BY

# United States Patent Office 2,917,287
Patented Dec. 15, 1959

2,917,287

HEATING AND/OR COOLING SYSTEM

Donald F. Tryon, Springfield, Mass., assignor to The Electro-Temp Corporation, Springfield, Mass., a corporation of Massachusetts Application October 28, 1957, Serial No. 692,781

1 Claim. (Cl. 257—274)

This invention is directed to new and useful improvements in structural refinements in a system for the combined heating and cooling of houses or buildings whereby the temperature conditions therein may be better regulated to meet the continual year-round seasonal changes.

The invention is directed more particularly to the provision of an automatic electric fluid heating/cooling system including a fluid container, an electric heater enclosed within said fluid container, an electric cooling unit connected with said fluid container, a heat/cold exchanger having supply and return connections with said fluid container, and an electric circuit control actuated by means of differential of temperatures in the room being regulated thereby to draw upon the supply of hot/cold water in the container to maintain the temperature in the room within predetermined limits.

Specifically, the invention pertains to a central integral heating and cooling system based on the storage of water heated or cooled during a particular period of time and involving the use of a circulating pump and a separate heating or cooling exchanger.

Many public utilities which supply electric current for various purposes charge a lower cost-rate for service during certain periods of each twenty-four-hour day when the normal demand is low in order to stimulate consumption during what are called off-peak periods. In this invention, methods and apparatus are disclosed for utilizing electric energy for heating/cooling purposes, particularly in order to permit the off-peak load capacity of electric generating stations and distribution systems to be better exploited.

I propose to reduce the cost of operation of the system by reducing the operation of the system at certain times in the 24-hour-day during which periods the greatest demands are made upon the power system, thereby permitting the operation of the system at less cost for power.

Wherever electricity is being used in large quantities, the rate of charge for current is usually based on two factors, namely, the energy charge based upon the actual amount of current used, and the demand charge based upon the maximum rate at which the current is used at a given instant. Usually this demand charge is figured as so much per kilowatt of maximum demand which occurs on the power company's on-peak period. If the current consumption can be arranged so that little or no energy is consumed between the hours limiting the company's on-peak period, the demand charge can be greatly reduced.

In a particular municipality, for example, the demand charge for current consumed between the hours of 4:30 and 8:30 p.m. may be $2.00 per month per kilowatt of maximum demand, whereas the demand charge for current consumed at other times of the day may be only $1.00 per month per kilowatt of maximum demand. Therefore, it is advantageous to arrange a system so that very little, if any at all, of the normal current consumption is used between the hours of 4:30 and 8:30 p.m. in this particular municipality.

The invention hereof provides means for automatically reducing the consumption of current during periods of the day, which periods may represent the peak demands made upon the power system.

The invention resides in the particular arrangement, construction and relationship of the various elements of the heating/cooling system as disclosed in the accompanying description in which the following objects of the invention will be apparent.

It is a principal object hereof to provide a hot water heating/cold water cooling system, particularly designed for house heating/cooling by electric current, and by means of which the heating/cooling may be effected during the major portion of the time by means of water which has been heated/cooled during the low cost rate periods.

One of the primary purposes of the invention is to provide structural and operational improvements in devices of the class to which reference has been made, which improvements not only simplify the structure as such, but also provide important distinct advantages in strength, durability, efficiency and the like.

Other prime objects of my invention include: first, the securement of a higher degree of accuracy and greater degree of variety in the manner of work performed therewith than has heretofore been possible with prior devices known in the art; second, the attainment of a higher speed of construction and assembly of the device due to its simplification of design and its unique composition of parts; third, the provision of a construction which may be readily installed with respect to the various purposes for which it is intended, and fourth, the provision of such other improvements in and relating to heating and/or cooling systems of the type above referred to as are hereinafter described and claimed.

In carrying the present invention into effect, for electric house and building heating/cooling, the method consists of heating/cooling a supply of water for storage in a tank, utilizing the electrical heating energy during the night hours or other periods of off-peak load, and releasing the heat/cold stored in the thermal storage body to the house or building as and when required.

The accumulation of hot/cold water in the heat/cold storage body is automatically controlled so as to insure that only the off-peak capacity of the electrical power system is used except under unusual or abnormal operating conditions.

The discharge of hot/cold water from the thermal storage body also is automatically controlled by thermostatic means arranged to maintain a constant house or building temperature.

The manner of transferring heat from the thermal storage body to the house or building may be easily varied and modified according to the specific type of hot air, hot water, steam or vapor house heating apparatus used.

Some of the advantages of the invention reside in its simplicity of construction, in its efficient and dependable operation, and in its adaptability to economical manufacture.

The invention is not limited in its application to the details of construction and arrangement of parts illustrated in the drawing, since the invention is capable of other embodiments. Here, I have illustrated an example of one embodiment of the invention wherein the components are combined and arranged in accordance with one mode which I have devised for the practical application of the principles of the invention. It will be understood however that various changes and alterations are contemplated and that other embodiments may be utilized within the scope of the claim and without departing from the basic principles and contemplated scope of the invention.

The invention is conceived as applicable for use with electricity as indicated in the specification and drawing, though it may also be used with gas, all without material alteration in the basic structural features of the invention.

It is to be further understood that the phraseology and terminology employed herein is for the purpose of description and not of limitation.

The invention is conceived as applicable for use with electricity as indicated in the specification and drawing, though it may also be used with gas, all without material alteration in the basic structural features of the invention.

It is to be further understood that the phraseology and terminology employed herein is for the purpose of description and not of limitation.

Accordingly, limitation of this invention should be made only as determined by a proper interpretation of the terms used in the subjoined claim.

In the drawing:

The figure is a diagrammatic view of the apparatus for heating/cooling embodying the novel features of the invention.

In the following description and claim, various details will be identified by specific names for convenience. These names however are intended to be as generic in their application as the art will permit.

Referring now to the drawing forming a part of this specification more in detail, and referring more particularly to the preferred form of my invention selected for illustrative purposes, I have shown a housing 2 which normally would be located in the basement of a building.

From this housing extends a system of ducts 4 to various rooms or divisions of the house or building for conducting the hot/cold air thereto through what will be referred to as the air handling unit.

Said air handling unit includes a radiator or water coil, a filter and a blower, each of which will now be described.

A unit generally indicated by 6 is disposed within the housing and may be defined as a radiator and may comprise any form for receiving hot/cold water circulated thereto and therefrom. Said radiator will be of the correct capacity to maintain the desired temperatures in the house or building.

A filter 8 of common form at the entrance of the housing is adapted to filter air for circulating through the duct system.

An air circulating fan or blower 10 disposed within the housing is driven by a motor 12 and delivers heated/cooled air into and through the duct system.

It will be here explained that outside air and/or return air in the house or a combination of the two is introduced to the housing for heating/cooling therein and for subsequent discharge therethrough and therefrom into the area being heated/cooled.

A storage tank which may be of any desired capacity, as for example 200 or 300 gallons, is represented by 14 and is adapted to hold a supply of the heated or cooled water.

A supply of water may be admitted thereto through a pipe 15 from a source of water, not shown.

Appropriate thermometers (not shown) may be fixed to the tank 14 for the well-known reasons.

The tank 14 is used to store the hot/cold water which is normally heated/cooled during the off-peak periods as will hereinafter be appreciated.

A water supply pipe 16 connects the tank 14 to the radiator 6 for the circulation of the heated/cooled water thereto.

A water return pipe 18 connects the radiator 6 to the tank 14.

An automatic temperature controlled mixing valve 20 is connected in the water supply pipe 16 and is connected by means of a water by-pass pipe 22 to the water return pipe 18. A valve 23 is connected in the by-pass pipe 22 and a valve 25 is connected in the water supply pipe 16.

The mixing valve 20 is of the type adapted to automatically mix water (hot or cold) flowing from the tank 14 with other water (warmer or cooler) flowing through the water return pipe 18 and the water by-pass pipe 22, all to the end that the water flowing to the radiator 6 will be within the desired temperature range. Said mixing valve is controlled and automatically adjusted by a thermostatic means (not shown) which may be located outside and/or inside of the house or building.

For purposes of illustration, it may be explained, that for heating purposes, the hot water flowing to the radiator 6 might be within the temperature range of 105–130° F., depending upon the temperature outside of the house or building, and for cooling purposes, the cold water flowing to said radiator might be within the temperature range of 35–55° F., again depending upon the outside temperature.

An automatic vent valve 24 may be connected in the water supply pipe 16 for purposes of automatically relieving entrapped air therewithin in order that the flow of the hot/cold water therethrough to the radiator 6 may be facilitated.

A valve 26 may be connected in the water return pipe 18 and may be electrically operated by an electric drive unit 28. Said valve is normally open during the heating operation and is normally closed during the cooling operation, as will hereinafter be observed.

A water cooling unit 30 which may be defined as a refrigerator or chilling unit is connected to the water return pipe 18 at opposite sides of the valve 26 and is operated by a motor 32.

As aforesaid, when the apparatus is operating for cooling purposes, the valve 26 is closed so that the water in the water return pipe 18 is directed through the water cooling or chilling unit prior to the return thereof to the tank 14.

A water pump 34, of ordinary form, is in the water return pipe 18 for circulating water from the unit 6 back to the tank 14 and is operated by a motor 36. The pump is of a capacity to circulate heated or cooled water from the tank 14 through the radiator in the air handling unit and back to the tank 14. Conceivably, by the closure of the valve 25 and the opening of valve 23, the pump may circulate heated water through the by-pass pipe 22 and the radiator 6 so as to by-pass the tank 14, or circulate cooled water from the refrigerating unit 30 through the by-pass pipe 22 and the radiator 6 so as to by-pass the tank 14.

An expansion tank 38 is disposed above the tank 14 and is connected thereto by a pipe 40. An overflow pipe 42 extends from the tank 38. Said tank is open to the atmosphere and takes care of any expansion during the heating cycle.

A low-water cut-off switch 44, of common form, is provided in the pipe 40 and is adapted to disable the electrical circuits when the level of water in the pipe 40 reaches a predetermined low point.

Electric immersion heaters 46 and 46' are inserted in the tank 14 for heating the water therein. Same may be of the sheathed type whereby a resistance conductor is imbedded in a mass of heat refractory and heat conductive electrical insulating material whereby the conductor is supported in spaced relation to the outer casing of the tank. Other types of immersion heaters might be used for raising the temperature of the water within the tank with equally effective results.

An operating aquastat 48 is disposed in the tank 14 as are aquastats 49 and 50. These aquastats are of common form and are arranged to open or close electrical circuits when the water attains predetermined temperatures, all as will be hereinafter observed.

Aquastat 48 is a high limit aquastat and functions to maintain a temperature of the water of approximately 210° F. during the off-peak period. This aquastat 48 must be in the "On" position to make any part of the heating system operative.

Aquastat 49 is a low limit aquastat which will re-energize its respective heater if the temperature of the water in the tank drops below a predetermined level, say 130° F., during the on-peak period.

Aquastat 50 is a low limit aquastat which will re-energize its respective heater if the temperature of the water in the tank drops below another predetermined level, say 120° F., during the on-peak period.

A heating thermostat 52 and a similar cooling thermostat 54 are provided. Conceivably, these may be combined in one instrument and located in one of the rooms or compartments of the house or building. These are of usual form and function to close and open electrical circuits at predetermined temperatures, as will be observed. Additional thermostats, in parallel with those shown, may be employed, if desired.

A power source is represented by 60.

An off-peak current consumption meter is represented by O for recording the consumption of current at off-peak rates during the established off-peak periods. A regular current consumption meter is represented by R for recording current consumption at regular rates during the established on-peak periods.

The meters O and R are connected by connections 62 and 64 respectively to one side 66 of a power supply line. One side of the power source 60 is connected by 68 to the other side 70 of the power supply line.

An electrically operated time switch 72 is connected by connections 74 to a power switch and has a blade 76 for connecting one side of the power source 60 either to the O or the R meter.

The time switch 72 is of well-known form and is adjusted to connect the lines 66 and 70 of the power supply line through the O meter to the power source during off-peak periods and to connect said power supply line through the R meter during periods of on-peak rate.

Fuse means are shown at 77. In lieu thereof, there may be circuit breakers or other devices operable to protect the electrical system against cross circuits, excessive loads, and the like, as is well known.

A connection 80 extends from the side 70 of the power supply line to the low-water cut-off 44 through a switch 81.

The low water cut-off is also connected by a connection 84 to the heating thermostat 52, which thermostat is connected by connection 86 to the relay 88.

Aquastat 48 is connected by connection 90 to the connection 84 and by the connection 94 to aquastats 49 and 50 and is also connected to switch arms 98 and 102 of time switches 100 and 104 respectively by means of connection 96.

The time switches 100 and 104 are adjustable for operating in synchronism with the time switch 72.

Heater 46 is connected by a connection 110 to a contact of a switch arm 112 of a relay 114. The switch arm 112 is connected by a connection 116 to the side 66 of the power line. Relay 114 is connected by a connection 118 to the side 66 of the power line.

Heater 46' is connected by a connection 120 to a contact of a switch arm 122 of a relay 124. The switch arm 122 is connected by a connection 126 to the side 66 of the power line. Relay 124 is connected by a connection 128 to the side 66 of the power line.

The relay 114 is connected by a connection 130 to the contact for the switch arm 98 of the time switch 100 and to the aquastat 49 by a connection 132. Aquastat 50 is connected by a connection 134 to the contact of a switch arm 102 of the time switch 104.

Relay 124 is connected by a connection 127 to the connection 134 and to the aquastat 50, as shown.

Pump motor 36 is connected by a connection 136 to the side 70 of the power supply line and by a connection 138 to a contact of a switch arm 140 of a relay 142. The switch arm 140 is connected by a connection 144 to the side 66 of the power supply line.

The motor 12 of the air circulating unit is connected by a connection 146 to the side 70 of the power supply line and by a connection 148 to a contact of a switch arm 150 of a relay 88. The switch arm 150 is connected by a connection 152 to the side 66 of the power supply line.

Relay 142 is connected by a connection 154 to the connection 86 extending to the relay 88.

Relays 142 and 88 are connected by connections 156 and 158 respectively to the side 66 of the power supply line.

The electrically operated valve 26 and motor 32 are parallel connected by connections 160 and are connected to the side 66 of the power supply line by connection 161, and to arm 164 of the relay 166 by the connection 162. The contact for the arm 164 is connected to the side 70 of the power supply line by a connection 168.

The relay 166 is connected by a connection 169 to the side 66 of the power supply line.

The relay 166 is connected by a connection 170 through the cooling thermostat 54 to the side 66 of the power supply line.

A single-pole double-throw switch marked Heating and Cooling is provided so that switch 81 is closed on heating and switch 174 is open on heating.

Switch 174 is provided in the connection 172 between the thermostat 54 and the side 70 of the power supply line.

It will be understood that the switch 174 may be combined with the switch 81 to provide a single-pole double-throw switch which functions for both heating and cooling operations.

Switch 81 is closed on heating and switch 174 is open on heating.

Switch 174 is closed on cooling and switch 81 is open on cooling.

A connection 176 connects the connection 170 and the connection 86.

The operation of this heating/cooling system is such that a substantially constant temperature will be automatically maintained in the area being served regardless of whether the outside temperature is above or below the desired temperature.

The operation will now be described.

It is evident that the design, construction and adjustment of the component parts may be such that with the tank 14 containing a predetermined amount of water, the heating system can be placed into operation.

With the heating switch 81 and the low water cut-off switch 44 in the "On" position, the circuit to the heater 46 and/or the heater 46' is completed if the aquastat 48 is in the "On" position.

The pump 34 and the fan 10 are activated by the thermostat 52.

The water in the tank can be heated regardless of house temperature provided the switch 81 is on so that the apparatus is in the heating cycle.

Aquastat 48 permits current to flow to the arms 98 and/or 102 which in turn closes the circuits to relays 114 and 124 so as to close the circuits to the heaters 46 and 46' respectively.

If aquastat 48 is in the "On" position, there is still another way in which the heaters 46 and 46' may be activated and that is through the aquastats 49 and 50 which will activate 114 or 124 if the contact arms 98 and 102 are in the "Off" positions.

During the cooling cycle, the switch 174 is closed so as to activate thermostat 54 and switch 81 is open whereby current is brought to relay 166 so as to close arm 164 which brings current through connection 162 to the motor 32 and the motorized member 28 of the valve 26. Motor 32 activates the chiller 30 and the motor 28 closes valve 26 so as to cause the fluid in the pipe 18 to flow through the chiller.

The circuit is completed to the side 66 of the power supply line by the connection 161.

I have determined that by means hereof, the automatic temperature regulating valve 20 functions to permit the flow of water to the air handling unit wherein the water so supplied may be within a temperature range (in the area of 105° F.) which is a lower range than has been heretofore used in prior art devices.

From the foregoing, the construction and operation of the device will be readily understood and further explanation is believed to be unnecessary.

Numerous modifications and changes will readily occur to those skilled in the art and it is not desired to limit the invention to the exact construction specifically shown and described above.

That is to say, the object of the invention may be attained by use of constructions which may be different in certain respects from those disclosed, all without departing from the underlying principles of the invention.

I do not intend to be limited to the specific details shown since various suitable modifications and variations in structural changes may be made without departing in any way from the spirit of the invention.

I desire by the following claim to include within the scope of my invention all such suitable variations, modifications and equivalents by which substantially the results of my invention may be obtained through the use of substantially the same or equivalent means.

Without further analysis, the foregoing is intended to so fully reveal the gist of my invention that others can, by applying current knowledge, readily adapt it for various applications without omitting features which, from the standpoint of prior art, fairly constitute essential characteristics of the generic or specific aspects of this invention, and therefore, such adaptations should and are intended to be comprehended within the meaning and range of equivalence of the claim below.

What it is desired to claim and secure by Letters Patent of the United States is:

In an automatic control combination heating and cooling system for controlling the temperature of a space through which a fluid mass of a heat/cold exchange medium is circulated and based upon the storage of a fluid mass which is heated or cooled electrically during an off-peak period and is circulated as required comprising, a storage chamber for a fluid mass having a relatively large heat and cold fluid storage capacity, an electric heater disposed within said storage chamber for heating the fluid mass, an electric cooler disposed without said storage chamber for cooling the fluid mass, an air handling unit including a heat exchange radiator and an electrically operated blower, a fluid supply line connecting said storage chamber and the radiator of said air handling unit for distributing the heated and cooled fluid masses for operational use, a fluid return line connecting the radiator of said air handling unit and said storage chamber for returning the used fluid masses to said storage chamber for storage, an electric motor driven circulating pump for forcing the circulation of the heated and cooled fluid masses from said storage chamber through said fluid supply line and the radiator of said air handling unit and said fluid return line, inlet and outlet connections between said cooler and said fluid return line for selectively distributing the used fluid masses to said cooler for cooling treatment, an automatic time switch mechanism for selectively connecting said heater and cooler to an electric power distribution system for operational use during predetermined off-peak load periods for the selective energizing of said heater and cooler and the selective heating and cooling of the fluid mass, and thermostatic means responsive to the differential of temperature in the space being regulated for controlling the operation of said pump and the blower of said air handling unit to draw upon the supply of the fluid mass in said storage chamber for maintaining the temperature in the space being regulated within predetermined limits, an electric circuit controlled by said thermostatic means and connected to said thermostatic means and said time switch mechanism and said pump and the blower of said air handling unit and said heater and said cooler whereby said heater and cooler are selectively operated to maintain the temperature of the space within certain predetermined limits.

References Cited in the file of this patent

UNITED STATES PATENTS

| | | |
|---|---|---|
| 2,344,555 | McGrath | Mar. 21, 1944 |
| 2,450,478 | Johnson | Oct. 5, 1948 |
| 2,450,983 | Osterheld | Oct. 12, 1948 |
| 2,555,250 | Schroeder | May 29, 1951 |
| 2,751,155 | Collat | June 19, 1956 |

FOREIGN PATENTS

| | | |
|---|---|---|
| 452,816 | Great Britain | Aug. 31, 1936 |